(12) United States Patent
Kobayashi et al.

(10) Patent No.: US 12,286,075 B2
(45) Date of Patent: Apr. 29, 2025

(54) VEHICLE CONTROL METHOD AND VEHICLE CONTROL DEVICE

(71) Applicant: Nissan Motor Co., Ltd., Yokohama (JP)

(72) Inventors: Junya Kobayashi, Kanagawa (JP); Yasuhiro Sakurai, Kanagawa (JP); Yasuhiro Suzuki, Kanagawa (JP); Yoshitsugu Takafuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/560,949

(22) PCT Filed: May 28, 2021

(86) PCT No.: PCT/JP2021/020468
§ 371 (c)(1),
(2) Date: Nov. 15, 2023

(87) PCT Pub. No.: WO2022/249463
PCT Pub. Date: Dec. 1, 2022

(65) Prior Publication Data
US 2024/0262314 A1    Aug. 8, 2024

(51) Int. Cl.
*B60R 25/24*    (2013.01)
*B60R 25/01*    (2013.01)
(Continued)

(52) U.S. Cl.
CPC .............. *B60R 25/24* (2013.01); *B60R 25/01* (2013.01); *B60W 30/06* (2013.01);
(Continued)

(58) Field of Classification Search
None
See application file for complete search history.

(56) References Cited

U.S. PATENT DOCUMENTS 7,130,739 B2 *  10/2006  Ito .................... F02D 41/266
                                                 701/115
7,564,342 B2 *   7/2009  Klein ................. B60R 25/104
                                                 340/426.36
(Continued)

FOREIGN PATENT DOCUMENTS

CN         1715629 A      1/2006
CN       110100448 A      8/2019
(Continued)

OTHER PUBLICATIONS

Extended European Search Report of May 14, 2024 of corresponding European Patent Application No. 21942155.9.

*Primary Examiner* — Carlos Garcia
(74) *Attorney, Agent, or Firm* — Global IP Counselors, LLP

(57) ABSTRACT

A vehicle control method and a vehicle control device are configured to control the movement of a vehicle based on operation of a terminal device located outside the vehicle. The vehicle receives from the terminal device a first signal indicating that a first button of the terminal device has been pressed. The vehicle doors are unlocked based on the reception of the first signal, and the vehicle is placed in a state in which movement control is permitted.

13 Claims, 3 Drawing Sheets

(51) Int. Cl.
   *B60W 30/06* (2006.01)
   *G07C 9/00* (2020.01)
(52) U.S. Cl.
   CPC ..... *G07C 9/00309* (2013.01); *B60W 2556/45* (2020.02); *G07C 2009/00507* (2013.01); *G07C 2009/00793* (2013.01); *G07C 2209/08* (2013.01)

(56) References Cited

U.S. PATENT DOCUMENTS

| | | | | |
|---|---|---|---|---|
| 8,093,987 | B2* | 1/2012 | Kurpinski | B60R 25/2009 340/426.15 |
| 10,412,546 | B2* | 9/2019 | Golgiri | H04W 4/40 |
| 10,569,740 | B2* | 2/2020 | Lee | H04W 4/40 |
| 10,750,320 | B2* | 8/2020 | Golgiri | H04W 72/0453 |
| 10,940,831 | B2* | 3/2021 | Ichinose | B60R 25/209 |
| 11,169,517 | B2* | 11/2021 | Lavoie | G05D 1/226 |
| 2001/0052705 | A1* | 12/2001 | Fisher | E05B 81/14 292/216 |
| 2002/0029382 | A1* | 3/2002 | Deniau | H04N 21/4532 348/E7.061 |
| 2003/0044266 | A1* | 3/2003 | Vandillen | B60P 1/433 414/537 |
| 2005/0110619 | A1* | 5/2005 | Klein | B60R 25/24 340/539.32 |
| 2007/0200668 | A1* | 8/2007 | Kurpinski | B60R 25/24 340/5.72 |
| 2009/0260408 | A1* | 10/2009 | Tsukazaki | B60R 25/02153 70/183 |
| 2010/0052931 | A1* | 3/2010 | Kolpasky | B60R 25/00 340/670 |
| 2010/0300162 | A1* | 12/2010 | Cappuccio | E05B 47/0607 70/257 |
| 2012/0086868 | A1* | 4/2012 | Takaya | H04N 21/4753 348/734 |
| 2012/0234061 | A1* | 9/2012 | Inoue | H01R 13/6397 70/255 |
| 2013/0093585 | A1* | 4/2013 | Ambani | B62J 6/045 340/475 |
| 2013/0268141 | A1* | 10/2013 | Du | G06F 17/00 701/2 |
| 2015/0088360 | A1* | 3/2015 | Bonnet | B62D 15/027 701/23 |
| 2015/0093961 | A1* | 4/2015 | vom Scheidt, Jr. | A63H 30/02 446/454 |
| 2016/0347279 | A1* | 12/2016 | Groeneveld | B60R 25/01 |
| 2017/0344001 | A1 | 11/2017 | Mukai | |
| 2019/0299981 | A1* | 10/2019 | Yoon | B60W 30/09 |
| 2019/0347881 | A1* | 11/2019 | Kolb | G07C 9/00182 |
| 2020/0310407 | A1 | 10/2020 | Van Wiemeersch et al. | |
| 2022/0043444 | A1* | 2/2022 | Lavoie | G05D 1/226 |
| 2022/0242366 | A1* | 8/2022 | Nagata | B60R 25/23 |
| 2023/0108802 | A1* | 4/2023 | Hashimoto | G05D 1/0212 701/2 |
| 2024/0262314 | A1* | 8/2024 | Kobayashi | B62D 1/00 |
| 2024/0326772 | A1* | 10/2024 | Kaneko | B60T 7/122 |

FOREIGN PATENT DOCUMENTS

| | | |
|---|---|---|
| CN | 1118606429 A | 10/2020 |
| CN | 112005553 A | 11/2020 |
| CN | 112622821 A | 4/2021 |
| DE | 10 2008 051 982 A1 | 6/2009 |
| DE | 10 2017 208 563 A1 | 11/2017 |
| JP | 2001-278010 A | 10/2001 |
| JP | 2001-297645 A | 10/2001 |
| JP | 2004-126729 A | 4/2004 |
| JP | 2007-302223 A | 11/2007 |
| JP | 2012-215922 A | 11/2012 |
| JP | 2014-54901 A | 3/2014 |
| JP | 2018-52188 A | 4/2018 |
| JP | 2018-131201 A | 8/2018 |
| JP | 2019-97078 A | 6/2019 |
| KR | 2019-0051637 A | 5/2019 |
| WO | 2019/202836 A1 | 10/2019 |

* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2021/020468, filed on May 28, 2021.

BACKGROUND

Technical Field

The present invention relates to a vehicle control method and a vehicle control device.

Background Information

An invention relating to a terminal device provided with a plurality of operation buttons for transmitting signals pertaining to parking control, such as a parking start signal for starting parking control and a parking stop signal for stopping parking control, to a parking control unit that is installed in a vehicle and that performs parking control based on signals from the outside is known (Japanese Laid-Open Patent Application No. 2019-97078—hereinafter referred to as Patent Document 1).

SUMMARY

According to the invention disclosed in Patent Document 1, a parking start button for transmitting a parking start signal and a parking stop button for transmitting a parking stop signal are added to a terminal device in addition to door lock and unlock buttons. Thus, there is the problem that the number of buttons on the terminal device increases with the addition of a function for transmitting signals pertaining to vehicle parking control, so that the manufacturing costs of the terminal device is increased.

In view of the problem described above, an object of the present invention is to provide a vehicle control method and a vehicle control device capable of adding a function for transmitting signals pertaining to parking control of a vehicle to a terminal device while preventing an increase in the number of buttons of the terminal device.

A vehicle control method and a vehicle control device, according to one aspect of the present invention, are configured to control the movement of a vehicle based on the operation of a terminal device located outside of the vehicle, wherein the vehicle receives a first signal from the terminal device, which indicates that a first button of the terminal device has been pressed, and based on the receiving of the first signal, the vehicle doors are unlocked and the vehicle is placed in a state in which the movement control of the vehicle is permitted.

By means of the present invention, a function for transmitting signals pertaining to the parking control of a vehicle can be added to a terminal device while preventing an increase in the number of buttons on the terminal device.

BRIEF DESCRIPTION OF THE DRAWINGS

Referring now to the attached drawings which form a part of this original disclosure.

DETAILED DESCRIPTION OF EMBODIMENTS

Figure 1:
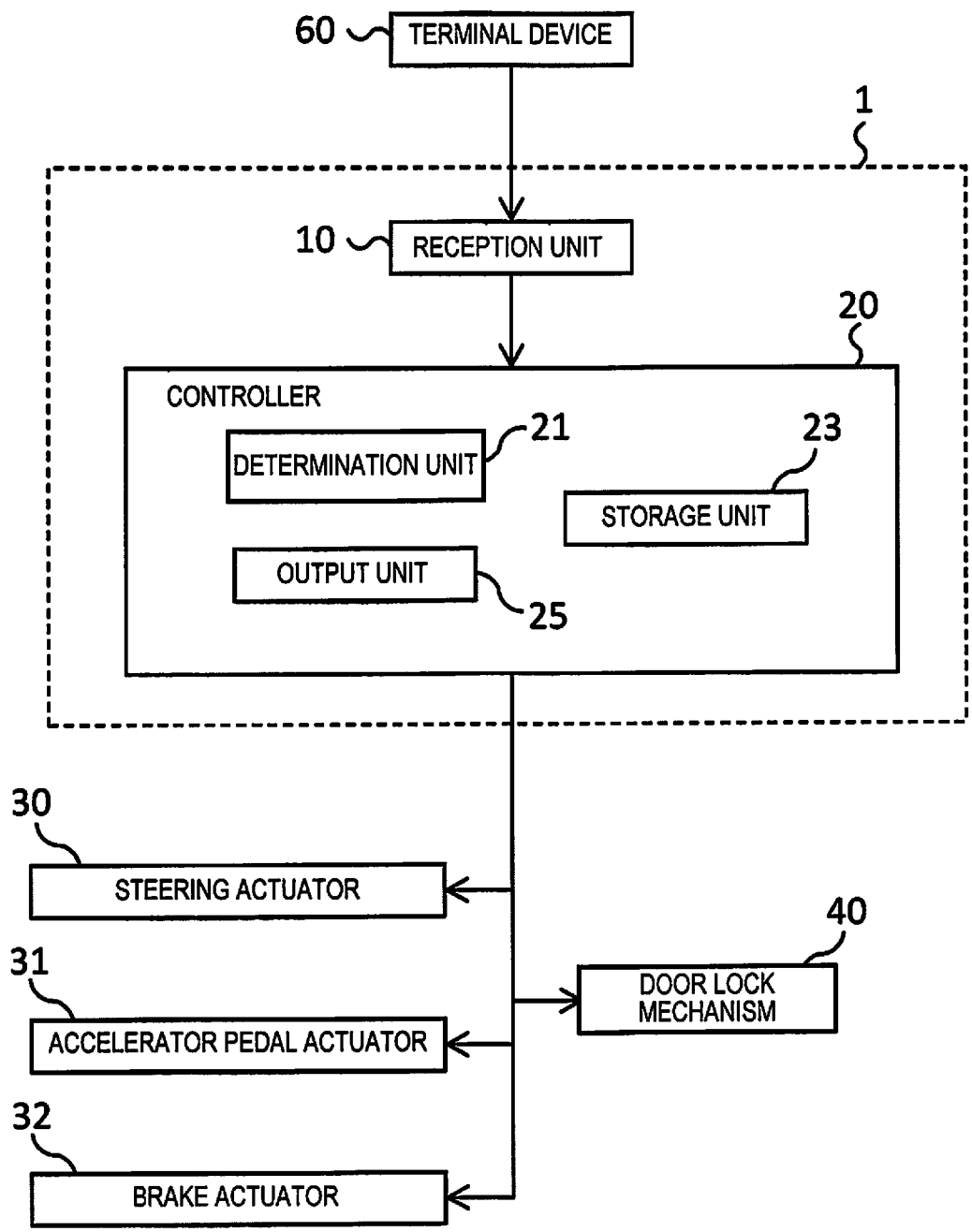
FIG. 1 is a block diagram showing the configuration of the vehicle control device according to an embodiment of the present invention.

An embodiment of the present invention is described below with reference to the drawings. In the descriptions of the figures, identical parts have been assigned the same reference numerals, and their descriptions have been omitted.

A configuration example of the vehicle control device according to the present embodiment will be described with reference to FIG. 1. The vehicle control device 1 is installed, for example, in a vehicle equipped with a parking assist function for providing assistance in entering or exiting a parking space.

By using the parking assist function of the vehicle, after a route for entering a selected parking space is computed, the user gets out of the vehicle with the terminal device and continuously sends execution commands to the vehicle by means of the terminal device, thereby moving the vehicle to enter the parking space. On the other hand, when exiting the parking space, the user continuously sends execution commands to the vehicle by means of the terminal device to move the vehicle along an exit route from the selected parking space.

As shown in FIG. 1, the vehicle control device 1 comprises a receiving unit 10 and a controller 20. Further, the vehicle control device 1 is connected to a steering actuator 30, an accelerator pedal actuator 31, a brake actuator 32, and a door locking mechanism 40 of the vehicle.

The vehicle control device 1 is also connected by means of wireless communication to a terminal device 60 external to the vehicle. The terminal device 60 may be a mobile terminal operated by a user, or a smart key that locks and unlocks door locks of a vehicle via the door locking mechanism 40.

Figure 3:
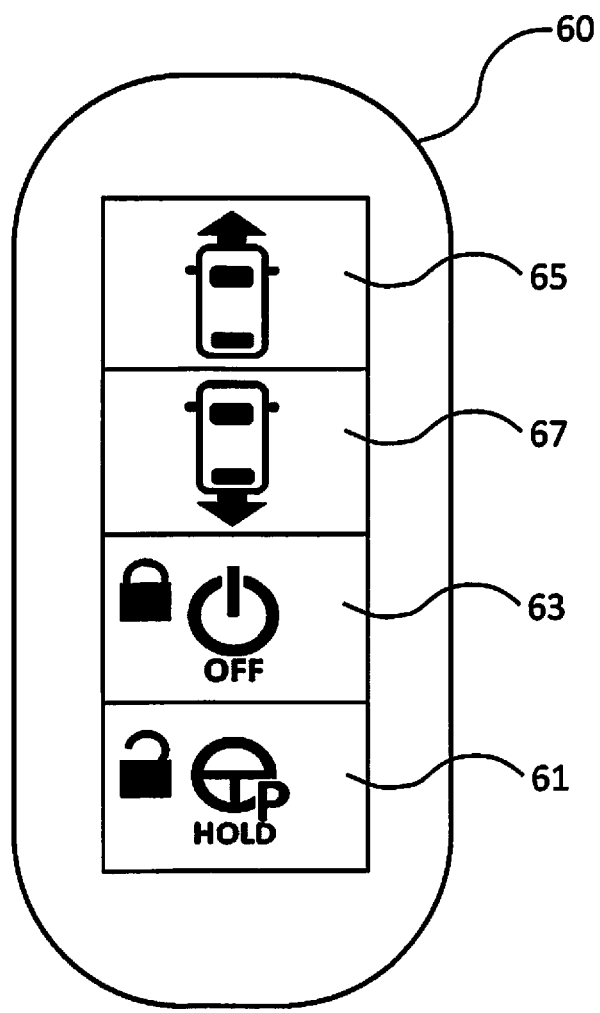
FIG. 3 is a diagram showing an example of the arrangement of buttons on a terminal device according to the embodiment of the present invention.

As shown in FIG. 3, the terminal device 60 is provided with an unlock button 61 (first button). When the user presses the unlock button 61, the terminal device 60 transmits an unlock signal (first signal).

In addition, as shown in FIG. 3, the terminal device 60 may be provided with a lock button 63 (second button), a different button than the unlock button 61. When the user presses the lock button 63, the terminal device 60 transmits a lock signal (second signal).

Further, as shown in FIG. 3, the terminal device 60 may be provided with a third button for specifying the direction of movement of the vehicle. In FIG. 3, a forward button 65 and a reverse button 67 correspond to the third button. When the user presses the forward button 65, the terminal device 60 transmits a forward signal, meaning that the vehicle is to move forward. Further, when the user presses the reverse button 67, the terminal device 60 transmits a reverse signal, meaning that the vehicle is to move backwards. The forward and reverse signals are designated as third signals.

As shown in FIG. 3, the lock button 63 may be arranged between the unlock button 61 and the third buttons (forward button 65, reverse button 67). More specifically, in the case that the unlock button 61, the lock button 63, the forward button 65, and the reverse button 67 are arranged along one direction, the unlock button 61 may be arranged on the outermost side in the arrangement direction (vertical direction in FIG. 3).

This prevents the unintentional simultaneous pressing of the unlock button 61 and the forward button 65, for example, or of the unlock button 61 and the reverse button 67, for example, with the same finger.

The receiving unit 10 receives signals (first, second, and third signals) transmitted from the above-described terminal device 60, which are then transmitted to the controller 20.

The terminal device 60 may, for example, transmit signals by means of radio waves, such as long waves or ultrashort waves, or transmit signals by means of infrared rays. Alternatively, the terminal device 60 and the receiving unit 10 may utilize mobile communication functions, such as 4G/LTE or 5G, to send and receive signals.

The controller 20 is a general-purpose computer comprising a CPU (Central Processing Unit), memory, a storage device, an input/output unit, etc.

A computer program (vehicle control program) is installed in the controller 20 to make it to function as the vehicle control device 1. By executing the computer program, the controller 20 functions as a plurality of information processing circuits included in the vehicle control device 1.

Here, an example is shown in which the plurality of information processing circuits included in the vehicle control device 1 is realized in software, but the information processing circuits can, of course, comprise dedicated hardware for executing each of the information processes shown below. Further, the plurality of information processing circuits may be realized in discrete hardware.

The controller 20 includes a determination unit 21, a storage unit 23, and an output unit 25.

The determination unit 21 refers to a device for determining the reception state of various signals transmitted from the terminal device 60 and received via the receiving unit 10. The determination unit 21 determines whether the unlock signal, which indicates that the unlock button 61 has been pressed, has been received. If it is determined that the unlock signal has been received, the determination unit 21 generates a signal to unlock of the door locking mechanism 40.

In addition, if it is determined that the unlock signal has been received, the determination unit 21 sets the vehicle in a state in which movement control is permitted (permitted state). The permitted state may be set when the door locking mechanism 40 is in an unlocked state, and the unlock signal is received. Even in this case, the door locking mechanism 40 is placed in the unlocked state when the unlock signal is received, so that the vehicle enters a state (permitted state) in which movement control is permitted.

There are two types of states that are set for a vehicle, the state (permitted state) in which movement control is permitted and the state (prohibited state) in which movement control is prohibited. For example, in the permitted state, parking assistance of the vehicle is permitted based on an operation of the terminal device 60 external to the vehicle. On the other hand, in the prohibited state, parking assistance of the vehicle based on an operation of the terminal device 60 is prohibited.

Further, if the determination unit 21 determines that the unlock signal is continuously received, the determination unit 21 may set that the vehicle to be in the permitted state. More specifically, the determination unit 21 may determine whether the unlock signal, which indicates that the unlock button 61 has been pressed, has been continuously received for at least a prescribed period of time, and if it is determined that the unlock signal has been continuously received for at least the prescribed period of time, the determination unit sets the vehicle to be in the permitted state.

The determination unit 21 may also determine whether the lock signal indicating that the lock button 63 has been pressed has been received. If it is determined that the lock signal has been received, the determination unit 21 generates a signal for locking the door locking mechanism 40.

Further, if it is determined that the lock signal has been received, the determination unit 21 sets the vehicle in a state in which movement control is prohibited (prohibited state). The prohibited state may be set when the door locking mechanism 40 is in the locked state.

The determination unit 21 may also determine whether a third signal has been received along with the unlock signal (first signal). If the vehicle is in the permitted state and it is determined that the third signal has been received together with the unlock signal (first signal), a movement control signal is generated for moving the vehicle in the direction of movement corresponding to the third signal.

For example, if it is determined that the forward signal has been received, the determination unit 21 may generate a forward control signal for instructing the vehicle to move forward. If it is determined that the reverse signal has been received, the determination unit 21 may generate a reverse control signal for instructing the vehicle to move backwards.

For example, in the case of a vehicle equipped with a parking assist function for assistance in entering or exiting a parking space, an entry or exit route is calculated in advance, and a movement control signal is generated for moving the vehicle forward or backwards along the route.

Further, the determination unit 21 may determine that the third signal has not been received. If it is determined that the third signal has not been received, then a stop signal for stopping the vehicle may be generated.

The storage unit 23 stores the state set for the vehicle. More specifically, whether the determination unit 21 has set the vehicle to be in the permitted state or the prohibited state is stored.

The output unit 25 outputs various signals generated by the determination unit 21. For example, the output unit 25 outputs signals to the door locking mechanism 40 for unlocking the door locking mechanism 40 and for locking the door locking mechanism 40.

Further, the output unit 25 outputs movement control signals, which are generated by the determination unit 21 31 for moving the vehicle in the direction of movement that corresponds to the third signal, to the steering actuator 30 and the accelerator pedal actuator. The output unit 25 also outputs a stop signal, which is generated by the determination unit 21 for stopping the vehicle, to the brake actuator 32.

Figure 2:
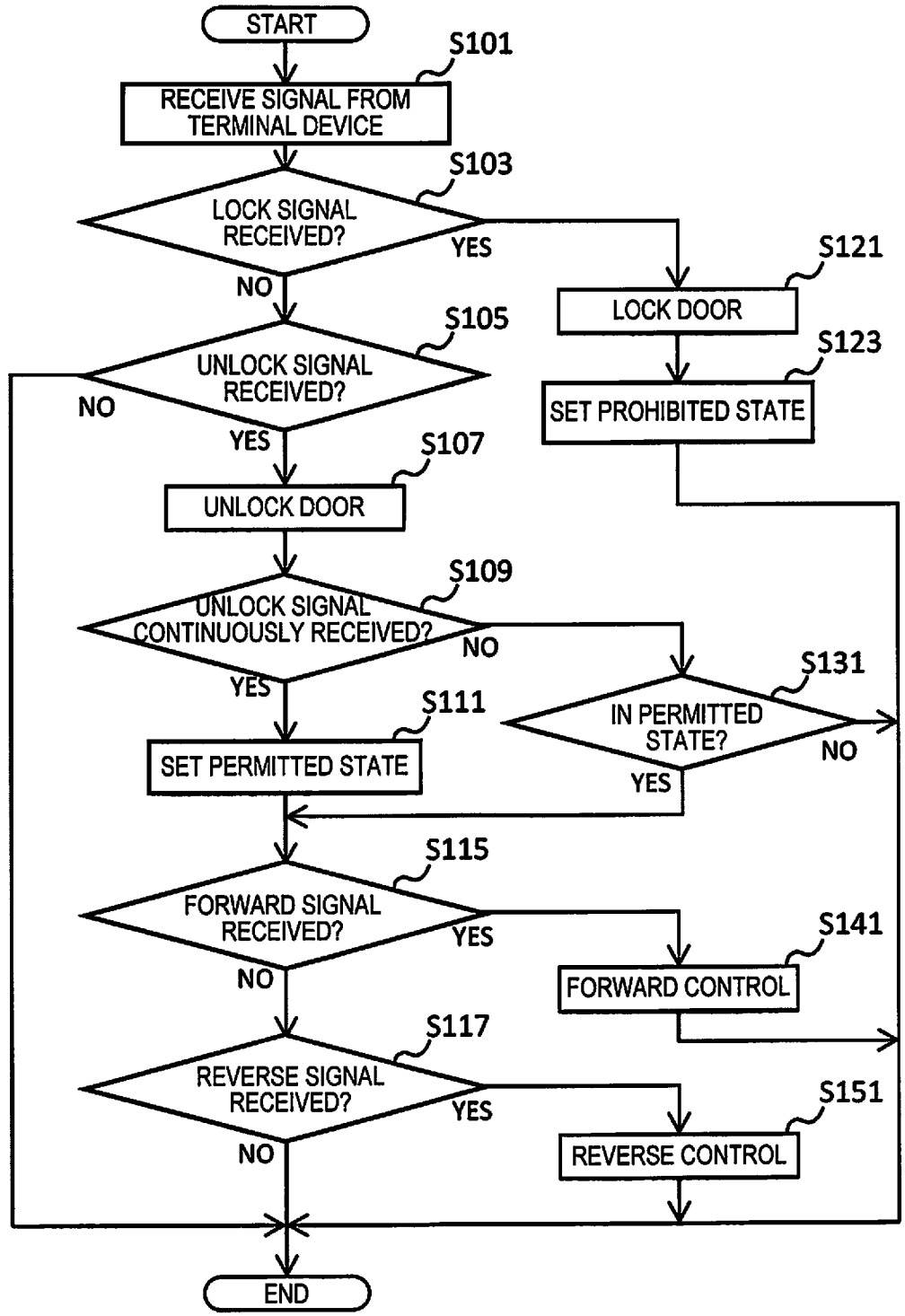
FIG. 2 is a flowchart showing the process of the vehicle control device according to the embodiment of the present invention.

The processing procedure of the vehicle control device 1 according to the present embodiment will now be described with reference to the flowchart of FIG. 2. The process shown in the flowchart of FIG. 2 is executed repeatedly. In the flowchart of FIG. 2, an example is described in which the determination unit 21 sets the permitted state when it is determined that the unlock signal has been continuously received.

In Step S101, the receiving unit 10 receives a signal transmitted from the terminal device 60. The received signal is transmitted to the controller 20.

In Step S103, the determination unit 21 determines whether the lock signal, which indicates that the lock button 63 has been pressed, has been received.

If the lock signal has been received (YES in Step S103), in Step S121, the determination unit 21 locks the doors of the vehicle via the door locking mechanism 40. Then, in Step S123, the determination unit 21 sets the vehicle to a state in which the movement control is prohibited (prohibited state). The process shown in the flowchart of FIG. 2 is then terminated.

On the other hand, if the lock signal has not been received (NO in Step S103), in Step S105, the determination unit 21 determines whether the unlock signal, which indicates that the unlock button 61 has been pressed, has been received.

If the unlock signal has not been received (NO in Step S105), the process shown in the flowchart of FIG. 2 is terminated. On the other hand, if the unlock signal has been received (YES in Step S105), in Step S107, the determination unit 21 generates a signal for unlocking the door locking mechanism 40 and unlocks the doors of the vehicle via the door locking mechanism 40.

In Step S109, the determination unit 21 determines whether the unlock signal is being continuously received.

If it is determined that the unlock signal is being continuously received (YES in Step S109, in Step S111, the determination unit 21 sets that the vehicle is in the permitted state. The process then proceeds to Step S115.

On the other hand, if it is determined that the unlock signal is not being continuously received (NO in Step S109), in Step S131, the determination unit 21 determines whether the vehicle is in the permitted state. If the vehicle is in the prohibited state and not the permitted state (NO in Step S131), the process shown in the flowchart of FIG. 2 is terminated. If the vehicle is in the permitted state (YES in Step S131), the process proceeds to Step S115.

In Step S115, the determination unit 21 determines whether the forward signal has been received along with the unlock signal. If it is determined that the forward signal has been received (YES in Step S115), in Step S141, the determination unit 21 generates a forward control signal for instructing the vehicle to move forward, thereby executing control to move the vehicle forward. The process shown in the flowchart of FIG. 2 is then terminated.

On the other hand, if it is determined that the forward signal has not been received (NO in Step S115), in Step S117, the determination unit 21 determines whether the reverse signal has been received along with the unlock signal. If it is determined that the reverse signal has been received (YES in Step S117), in Step S151, the determination unit 21 generates a reverse control signal for instructing the vehicle to move backwards, thereby executing control to move the vehicle backwards. The process shown in the flowchart of FIG. 2 is then terminated.

If it is determined that nether the forward signal nor the reverse signal has been received (NO in Step S117), the process shown in the flowchart of FIG. 2 is terminated.

As described above in detail, in the vehicle control method and the vehicle control device according to the present embodiment, when movement control of a vehicle is performed based on the operation of a terminal device located outside of the vehicle, the vehicle receives a first signal from the terminal device, which indicates that a first button of the terminal device has been pressed, and based on the receiving of the first signal, the doors of the vehicle are unlocked, placing the vehicle in a state in which the movement control is permitted.

In this way, the user can issue an instruction to unlock the vehicle doors and permit movement control of the vehicle by pressing only the first button of the terminal device. Thus, a vehicle parking control function can be added to the terminal device while preventing an increase in the number of buttons of the terminal device. More specifically, it becomes unnecessary to provide a new button to permit movement control of the vehicle separately from the button for unlocking the vehicle doors. Thus, an increase in the manufacturing cost of the terminal device can be suppressed, and the size of the terminal device can be reduced. As a result, user convenience can be improved.

Further, when control for performing movement control of a vehicle is executed based on the operation of a terminal device located outside of the vehicle, the control is usually executed under the condition that the vehicle doors are unlocked, however, since the vehicle is placed in a state in which movement control is permitted at the same time that the user unlocks the vehicle doors based on the receiving of the first signal, the user can place the vehicle in a state in which movement control is permitted at the same time that the user unlocks the vehicle doors by operating only the first button, thereby improving user convenience.

Further, by means of the vehicle control method and the vehicle control device according to the present embodiment, the vehicle doors may be unlocked when the first signal is received for less than a prescribed period of time, and the vehicle may be placed in a state in which the movement control is permitted when the first signal is received continuously for a prescribed period of time. As a result, if the first button of the terminal device is pressed for a short period of time, only the unlocking of the vehicle doors is carried out, and if the first button of the terminal device is pressed for a longer period of time, movement control of the vehicle may be permitted. As a result, the user is able to distinguish between the instructions based on the length of time that the first button of the terminal device is pressed. Therefore, the user can just unlock the vehicle doors based on the length of time that the first button of the terminal device is pressed without the provision of separate buttons for placing the vehicle in state in which movement control is permitted and for unlocking the vehicle doors. For this reason, an increase in the number of buttons of the terminal device can be prevented without compromising user convenience.

Further, by means of the vehicle control method and the vehicle control device according to the present embodiment, a second signal may be received that indicates that a second button has been pressed from a terminal device with a second button that is different from the first button, and, based on this receiving of the second signal, the vehicle may be placed in state in which movement control is prohibited. The user can thus issue an instruction to prohibit the movement control of the vehicle only by pressing a second button of the terminal device.

Further, by means of the vehicle control method and the vehicle control device according to the present embodiment, the vehicle doors may also be locked when the second signal is received. The user can thereby issue an instruction to lock the vehicle doors and prohibit movement control of the vehicle by pressing only a second button of the terminal device. Thus, a vehicle parking control function can be added to the terminal device while preventing an increase in the number of buttons of the terminal device. More specifically, it becomes unnecessary to provide a new button to prohibit movement control of the vehicle separately from the button for locking the vehicle doors. Thus, an increase in the manufacturing costs of the terminal device can be suppressed, and the size of the terminal device can be reduced. As a result, user convenience can be improved.

Further, when control for performing movement control of a vehicle is executed based on the operation of a terminal device located outside of the vehicle, the control is usually executed under the condition that the vehicle doors are unlocked. Thus, in the case that the user places the vehicle in a state in which movement control is prohibited by operating the second button, user convenience is not compromised even if the vehicle doors are locked at the same time.

Further, by means of the vehicle control method and the vehicle control device according to the present embodiment, a third signal may be received that indicates that a third button has been pressed from a terminal device with a third button that specifies the direction of movement of the vehicle, wherein only if the vehicle is in a state in which movement control is permitted and both the first and third signals are received is the vehicle moved in the direction of movement corresponding to the third signal. This allows the user to indicate the direction of movement of the vehicle by pressing the first and third buttons simultaneously. Thus, a vehicle parking control function can be added to the terminal device while preventing an increase in the number of buttons of the terminal device, thereby improving user convenience.

Further, in the vehicle control method and the vehicle control device according to the present embodiment, the second button may be arranged between the first button and the third button of the terminal device. This prevents the unintentional simultaneous pressing of the first button and the third button of the terminal device with the same finger, thereby preventing the unintended simultaneous pressing from being performed. As a result, an unintended movement control of the vehicle by the user can be suppressed.

It should be noted that although the simultaneous pressing of the first and second buttons, as well as the simultaneous pressing of the second and third buttons are not prevented, the second button is pressed in either case of simultaneous pressing. Therefore, the locking of the vehicle doors and the prohibiting of the movement control of the vehicle are carried out. As a result, an unintended movement control of the vehicle by the user is suppressed.

Furthermore, in the vehicle control method and the vehicle control device according to the present embodiment, the first, second, and third buttons of the terminal device are arranged along one direction, and the first button may be arranged on the outermost side in the arrangement direction. This prevents the accidental simultaneously pressing of the first button and the third button of the terminal device.

Each of the functions indicated in the above-described embodiment can be implemented by one or more processing circuits. The processing circuits include a programmed processor, electronic circuits, etc., and also include such devices as application-specific integrated circuits (ASIC) and circuit components configured to execute the described functions.

Although the present invention has been described above in accordance with an embodiment, the present invention is not limited by these descriptions, and that various modifications and improvements are possible will be obvious to a person skilled in the art. The descriptions and drawings that form part of this disclosure should not be understood as limiting the present invention. Various alternative embodiments, examples, and operational techniques will be apparent to those skilled in the art from this disclosure.

Needless to say, the present invention can include various other embodiments and the like not described herein. Therefore, the technical scope of the present invention is determined only by the matters specifying the invention according to the Claims that are pertinent to the description above.

The invention claimed is:

1. A vehicle control method for controlling movement of a vehicle based on an operation of a terminal device located outside the vehicle, the vehicle control method comprising:
   providing the terminal device with a first button that is a single button;
   receiving from the terminal device that transmits a first signal when the first button has been pressed; and
   unlocking vehicle doors based on reception of the first signal that places the vehicle in a state in which remote movement control of the vehicle in a forward direction or a backward direction is permitted based on operation of the terminal device.

2. The vehicle control method according to claim 1, wherein
   the vehicle doors are unlocked based on the reception of the first signal for less than a prescribed period of time, and the vehicle is placed in a state in which the movement control is permitted based on continuous reception of the first signal for a prescribed period of time.

3. The vehicle control method according to claim 1, wherein
   the terminal device has a second button that specifies a direction of the movement of the vehicle,
   a second signal indicating that the second button has been pressed is received from the terminal device, and
   the vehicle is moved in a direction of a movement corresponding to the second signal only when the vehicle is in a state in which the movement control is permitted and both the first signal and the second signal are received.

4. The vehicle control method according to claim 1, wherein
   the terminal device has a second button that is different from the first button,
   a second signal indicating that the second button has been pressed is received from the terminal device, and
   the vehicle is placed in a state in which the movement control is prohibited based on reception of the second signal.

5. The vehicle control method according to claim 4, wherein
   the vehicle doors are locked based on the reception of the second signal.

6. A vehicle control device comprising:
   a receiving unit configured to receive a signal from a terminal device located outside a vehicle, and
   a controller configured to carry out remote movement control of the vehicle based on the signal,
   wherein
   the terminal device has a first button that is a single button,
   the receiving unit receives from the terminal device that transmits a first signal when the first button has been pressed, and
   the controller unlocks vehicle doors based on reception of the first signal that places the vehicle in a state in which the remote movement control of the vehicle in a forward direction or a backward direction is permitted based on operation of the terminal device.

7. The vehicle control device according to claim 6, wherein
   the controller unlocks the vehicle doors based on the reception of the first signal for less than a prescribed period of time, and places the vehicle in a state in which the movement control is permitted based on continuous reception for the prescribed period of time.

8. The vehicle control device according to claim 6, wherein
- the terminal device has a second button that specifies a direction of movement of the vehicle,
- the receiving unit receives from the terminal device a second signal indicating that the second button has been pressed, and
- the controller moves the vehicle in a direction of a movement corresponding to the second signal only when the vehicle is in a state in which the movement control is permitted and both the first signal and the second signal are received.

9. The vehicle control device according to claim 6, wherein
- the terminal device has a second button that is different from the first button,
- the receiving unit receives from the terminal device a second signal indicating that the second button has been pressed, and
- the controller places the vehicle in a state in which the movement control is prohibited based on reception of the second signal.

10. The vehicle control device according to claim 9, wherein
- the controller locks the vehicle doors based on the reception of the second signal.

11. The vehicle control device according to claim 9, wherein
- the terminal device has a third button that specifies a direction of movement of the vehicle,
- the receiving unit receives from the terminal device a third signal indicating that the third button has been pressed, and
- the controller moves the vehicle in a direction of a movement corresponding to the third signal only when the vehicle is in a state in which the movement control is permitted and both the first signal and the third signal are received.

12. The vehicle control device according to claim 11, wherein
- the second button is arranged between the first button and the third button.

13. The vehicle control device according to claim 11, wherein
- the first button, the second button, and the third button are arranged along one direction, and
- the first button is arranged on an outermost side in an arrangement direction.

* * * * *